July 5, 1966 S. H. LEBLANG 3,259,530
METHOD OF DOUBLE AGEING A MAGNETIC HYSTERESIS ALLOY
Filed Sept. 18, 1963
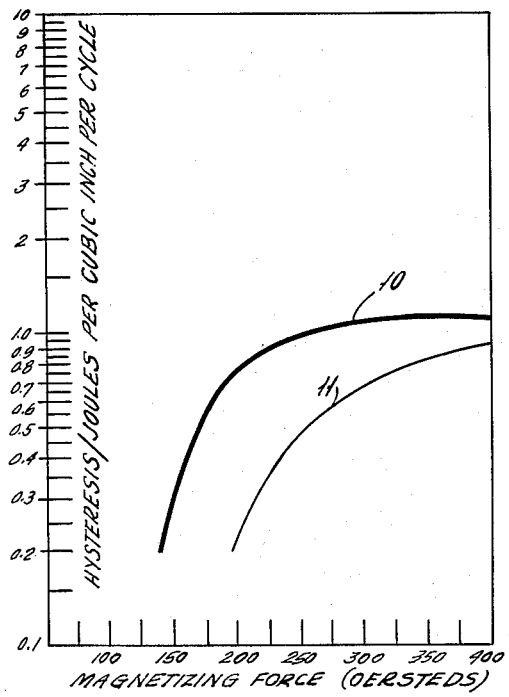
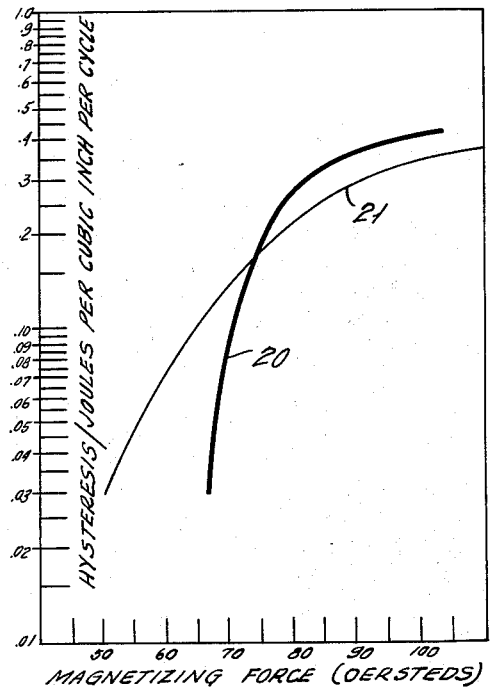
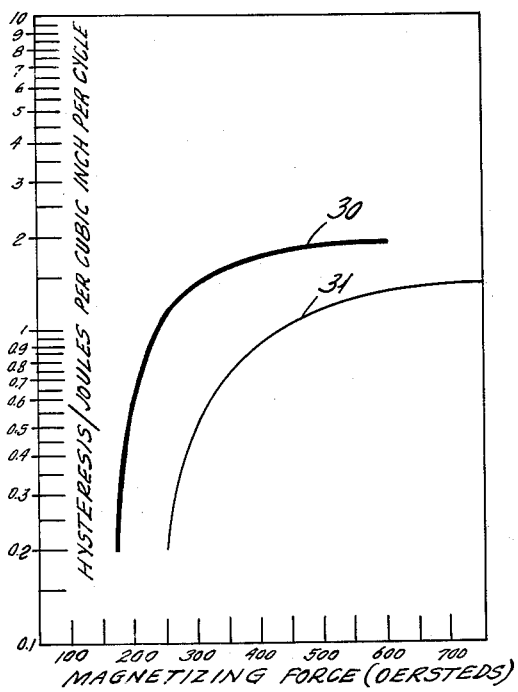
INVENTOR.
STANLEY H. LEBLANG
BY
OSTROLENK, FABER, GERB & SOFFEN
ATTORNEYS

United States Patent Office

3,259,530
Patented July 5, 1966

3,259,530
METHOD OF DOUBLE AGEING A MAGNETIC HYSTERESIS ALLOY
Stanley H. Leblang, Plainview, N.Y., assignor to Permag Corporation, Jamaica, N.Y., a corporation of New York
Filed Sept. 18, 1963, Ser. No. 309,838
6 Claims. (Cl. 148—102)

This invention relates to magnetic hysteresis alloys, and more particularly to such alloys useful in the fabrication of magnetic elements for hysteresis torque devices, e.g., for hysteresis motors, brakes or clutches.

In hysteresis torque devices the driving force is provided by a rotating magnetic field. Such field induces rotating magnetic poles in the magnetic element of the device, which poles are caused by hysteresis to lag behind those of the applied field, producing an accelerating torque.

The amount of torque developed per unit volume of magnetic material under such conditions is directly proportional to the hysteresis loss exhibited by the material when subjected to a given magnetizing force. The hysteresis or energy loss per cycle of magnetization may be determined by measuring the area enclosed by the hysteresis loop through which the magnetic element is driven, i.e., the closed loop determined by plotting the magnetic induction as a function of the magnetic field strength as it varies in one cycle between equal positive and negative values.

In order to provide optimum performance in a hysteresis torque device, e.g., to provide maximum torque, minimum volume and high efficiency, the hysteresis loss of the magnetic hysteresis element utilized should be as large as possible for a given exciting magnetizing field. Since, however, the strength of the required exciting field is subject to practical limitations, e.g., is generally less than about 350 oersteds, it is desirable that the magnetic material employed for the hysteresis element exhibit maximum efficiency at as low an exciting field strength as possible.

The magnetic properties of a hysteresis element are also dependent upon the degree to which such element utilizes the peak values of the field intensity and induction produced therein during operation. Such characteristic is measured by the energy factor (eta), defined as the ratio of the area of the hysteresis loop to the area of a rectangle drawn through the peak field intensity and induction values of the hysteresis curve. Materials useful for hysteresis torque devices typically have energy factor values ranging from about 0.5 to 0.75, i.e., possess relatively rectangular hysteresis loops.

A further criterion for magnetic materials useful in hysteresis torque devices is the ratio of the hysteresis loss $(E_h)$ to the peak magnetomotive force $(H_p)$ required; this characteristic is defined as the efficiency of the hysteresis material. The peak efficiencies of various commercially available hysteresis alloys range from 0.142 for 36% cobalt steel, to 0.158 for 17% cobalt steel, to 0.330 for P–6 alloy.[1]

It is among the objects of the present invention to provide magnetic hysteresis alloys displaying improved magnetic characteristics when measured by the preceding criteria.

A further object of the invention is to provide such alloys which may be cast in one-piece constructions, and which will exhibit superior magnetic properties in predetermined directions chosen to provide optimum performance in the devices for which they are intended.

An additional object of the invention is to provide a novel method for forming such magnetic hysteresis alloys, which method is both simple and economical to perform.

The nature and objects of the invention will be more fully apparent from a consideration of the following detailed description of preferred embodiments thereof, taken in connection with the accompanying drawing FIGURES 1, 2 and 3 of which illustrate the hysteresis loss vs. magnetizing force for various alloys prepared in accordance with the present invention, as compared with the corresponding characteristics of various known magnetic hysteresis materials.

It has been found that the objects of this invention are advantageously achieved by providing a magnetically anisotropic element for use as the rotor or other magnetic element in a hysteresis torque device, which element comprises an alloy constituted of from about 20 to 26 weight percent cobalt, from about 11 to 17 weight percent nickel, from about 7 to 9 weight percent aluminum, from about 0.3 to 3 weight percent silicon, up to about 3 weight percent zirconium, and the balance substantially iron, the alloy exhibiting a hysteresis loss of from about 0.03 to 1.5 joules/in.³/cycle when subjected to a magnetizing force of from about 50 to 350 oersteds.

Hysteresis alloys within the class defined above have been found to possess high values of saturation induction $(B_s)$, high values of residual induction $(B_r)$, relatively small coercive forces $(H_c)$ of from about 50 to 300 oersteds, and peak efficiencies of from about 0.310 to 0.345. Moreover, such alloys possess relatively rectangular hysteresis loops and have energy factors in excess of 0.75. It has also been found that the alloys provided in accordance herewith may be readily formed into one-piece constructions for hysteresis devices without serious deterioration of their magnetic characteristics. Such a characteristic is desirable since, unlike the laminated cold worked assemblies in which the P–6 alloy must be incorporated, for example, a one-piece magnetic hysteresis element may be used without substantial risk of mass shift in high speed rotational devices.

The novel magnetic hysteresis alloys of the present invention are produced employing a method for preparing magnetically anisotropic elements in which a cast body of the indicated alloy composition is subjected to a magnetic field during the cooling operation required for magnetic hardening, the improvement in which method, according to the present invention, comprises subjecting the magnetized hardened alloy casting, after cooling to ambient temperature, to a double ageing treatment involving initially heating the casting at a temperature in excess of 650° C. for a period of from about ½ to 1½ hours, and subsequently heating the casting at a temperature of from about 550° to 600° C. for a period of from about 1 to 10 hours. By thus ageing the magnetized anisotropic element, it has unexpectedly been found that an alloy having markedly superior properties for use in hysteresis torque devices is produced. Alloys thus prepared have been found to exhibit hysteresis losses of up to about 1.5 joules/in.³/cycle when subjected to magnetizing forces of less than 350 oersteds.

Such characteristic differs markedly from previously known anisotropic magnet elements prepared in accordance with the method described, for example, in U.S. Patent 2,295,082. The anisotropic material of the aforesaid patent, commercially available as Alnico 5, possesses

[1] P–6 alloy is a nickel-cobalt-vanadium-iron alloy described in U.S. Patent No. 2,596,705.

a high coercive force and has a hysteresis loss which is less than 0.08 joules/in.$^3$/cycle when subjected to magnetizing forces of about 400 oersteds (see Permanent Magnets and Their Application, Parker and Studders, 1962, John Wiley and Sons, Inc., p. 239). On the other hand, the hysteresis alloys hereof, which have been subjected to the aforesaid double ageing treatment, exhibit low coercive forces and may be driven by relatively low magnetizing fields, such as may be practically utilized in hysteresis torque devices.

It is believed that the double ageing treatment hereof effects a precipitation of a complex phase structure, the second ageing step partially reversing the precipitation and producing a microstructure exhibiting the novel hysteresis characteristics of the alloys of the invention. It will, however, be understood that this suspected mode of operation is intended as explanatory and is not limiting of the methods and compositions of the present invention.

The magnetic hysteresis alloys prepared in accordance herewith are ferrous alloys containing from about 20 to 26, preferably from about 23 to 25, weight percent cobalt, from about 11 to 17, preferably from about 13 to 15, weight percent nickel, from about 7 to 9, preferably from about 7.5 to 8, weight percent aluminum, from about 0.30 to 3, desirably about 0.45, weight percent silicon, and from 0 up to about 3 weight percent zirconium. The copper and titanium components conventionally incorporated in aluminum-nickel-cobalt alloys are preferably excluded from the compositions of the present alloys, such materials having been found to interfere with the desired hysteresis characteristics thereof. However, while alloys containing up to about 3 weight percent copper have approximately 15% poorer hysteresis characteristics than those alloys from which copper has been excluded, it has been found that such copper containing alloys are nevertheless substantially superior to known materials such as the 17% and 36% cobalt steels, which are currently commercially employed in hysteresis devices. In the case of titanium impurities, the proportion which may be tolerated without substantial impairment of the hysteresis characteristics of the treated alloys is more minute, it being preferred that no more than at the most about 0.2 to 0.3 weight percent titanium impurity be present in the alloys.

The magnetic hysteresis alloys are prepared by melting the component metals in the designated proportions, e.g., by heating at a temperature of about 1650° C. or higher, and thereafter casting alloy bodies therefrom, as by pouring the alloy melts into suitable sand molds. After cooling the alloy bodies to the ambient temperature they are heated above their Curie temperatures (about 890° C.), desirably to temperatures of about 920° C., and thereafter rendered magnetically anisotropic in the manner more fully described in the aforesaid U.S. Patent 2,295,082. The bodies are thus simultaneously cooled and subjected to an oriented magnetic field in a direction corresponding to the desired direction of magnetization of the hysteresis element.

It has been found preferably to employ magnetizing forces of at least about 200 oersteds, and preferably about 1,000 oersteds, while simultaneously cooling the castings at rates of from about 30° to 60° C., desirably about 30° C., per minute, to effect the desired magnetization. When the alloy castings are cooled at rates in excess of 100° C. per minute insufficient nucleating occurs, whereas when the castings are cooled at rates of less than 30° C. per minute the particles produced are too large.

The alloys are thereafter subjected to the hereinabove described double ageing treatment, the first stage of which involves, as noted, heating the alloys to a temperature in excess of 650° C., preferably from about 700° to 775° C., and maintaining it within such temperature range for a period of from about ½ to 1½ hours. The alloy castings are thereafter heated, in the second stage of the ageing operation, at a temperature of from about 550° to 600° C., for a period of from about one hour to ten hours. It will be understood that, within the designated ranges, the castings are heated for a longer period at the lower temperatures and, conversely, for a shorter period at the higher temperatures.

While it is known to subject magnetically anisotropic materials to heat treatments, variously described as ageing, annealing, or drawing operations, at temperatures of from 550° C. to 650° C. (see, for example, U.S. Patents 2,499,860 and 2,673,319), such treatments produce alloys which do not possess the novel hysteresis characteristics of those obtained in accordance with the present invention. Moreover, the two-stage ageing treatment hereof, unexpectedly eliminates any previous differences in the thermal histories of the alloy castings treated and produces the desired substantially uniform hysteresis characteristics of the alloys of this invention.

In order that the concept of the present invention may be more completely understood the following examples are set forth by way of illustration; it will be understood that any specific enumeration of detail contained in such examples should not be interpreted as limiting the scope of the invention except as indicated in the appended claims.

*Example 1*

An alloy was prepared by melting the following composition and casting the melt into test bars and rotors for hysteresis motors.

| Component: | Weight percent |
|---|---|
| Cobalt | 24.10 |
| Nickel | 14.10 |
| Aluminum | 7.50 |
| Silicon | 0.70 |
| Iron | Balance |

The resulting castings were heated above the Curie point of the alloy (890° C.) at a temperature of 920° C., transferred into a magnetic field of 1,000 oersteds and allowed to cool within such field from 920° C. to the ambient temperature (about 25° C.) at a rate of about 30° C. per minute. The castings were thereafter subjected to the double ageing treatment hereof by initially being heated at 750° C. for 1 hour, and thereafter being heated at 570° C. for 2 hours.

Each of the alloy castings possessed a density of 0.267 lb./cu. in., a tensile strength of 22,000 p.s.i., a Rockwell hardness of 42, a coefficient of thermal expansion of 11.7 per ° C.$\times 10^6$, and an electrical resistivity of 43 microhms per cm./cm.$^2$ at 25° C.

Cast rotors thus produced and treated were then finish ground on the outside diameter, inside diameter, and thickness, and built into hysteresis motors, replacing rotors of cobalt steel. Under these circumstances, with other operating conditions remaining the same, the motor characteristics, such as the maximum torque at synchronous speed or pullout torque, the starting torque, and the stall torque, measured about 70% better than when the same motors were tested embodying rotors consisting of 17% and 36% cobalt steel.

*Example 2*

Hysteresis elements were prepared by melting, casting and thereafter simultaneously cooling and magnetizing the composition of Example 1, in the same manner as described therein. The castings were then double aged by being heated at 750° C. for 1½ hours, and thereafter being heated at 570° C. for 1 hour.

Each of the alloy castings possessed a density of 0.267 lb./cu. in., a tensile strength of 26,000 p.s.i., a Rockwell hardness of 40, a coefficient of thermal expansion of 11.8 per ° C.$\times 10^6$ and an electrical resistivity of 43 microhms per cm./cm.$^2$ at 25° C.

Example 3

Hysteresis elements were prepared in the manner described in Example 1, from the following composition:

| Component: | Weight percent |
|---|---|
| Cobalt | 23.70 |
| Nickel | 14.50 |
| Aluminum | 7.60 |
| Silicon | 0.45 |
| Zirconium | 0.25 |
| Iron | Balance |

After treating the alloy elements to induce magnetic anisotropy as described in Example 1, and doubly ageing the resulting elements, first at 750° C. for 1 hour and then at 570° C. for 6 hours, they were built into hysteresis motors as described above and the operation of such motors was compared with the operation of corresponding motors employing 17% and 36% cobalt steel rotors. As above, it was found that the motor characteristics, such as the maximum torque at synchronous speed or pullout torque, the starting torque, and the stall torque, measured about 70% better than the corresponding characteristics of the hysteresis motors embodying the cobalt steel rotors.

Each of the resulting castings possessed a density of 0.267 lb./cu. in., a tensile strength of 22,000 p.s.i., a Rockwell hardness of 44, a coefficient of thermal expansion of 11.7 per ° C$\times 10^6$, and an electrical resistivity of 43 microhms per cm./cm.$^2$ at 25° C.

The magnetic properties of the alloy castings produced in accordance with Examples 1 to 3 above were measured along the axes of the castings corresponding to the magnetic field axes employed to induce magnetic anisotrophy. These properties were determined in conventional manner and are tabulated below. For comparative purposes the magnetic characteristics of the P-6 alloy, and the 17% and 36% cobalt steel alloys, which alloys are used commercially in hysteresis torque devices, are also included in the following table:

TABLE.—HYSTERESIS CHARACTERISTICS

| Alloy | Example 1 | Example 2 | Example 3 |
|---|---|---|---|
| Residual Induction ($B_r$, gausses) | 14,000 | 13,200 | |
| Saturation Induction ($B_s$, gausses) | 15,800 | 16,000 | 15,600 |
| Coercive Force ($H_c$, Oersteds) | 160 | 250 | 220 |
| Exciting Field (Magnetizing force in Oersteds for maximum efficiency) | 150–200 | 70–80 | 200–300 |
| Efficiency | 0.325 | 0.310 | 0.345 |

| Alloy | Cobalt Steel | | P-6 Alloy |
|---|---|---|---|
| | 17% | 36% | |
| Residual Induction ($B_r$, gausses) | 10,700 | 10,400 | 14,200 |
| Saturation Induction ($B_s$, gausses) | 16,500 | 14,500 | 18,000 |
| Coercive Force ($H_c$, Oersteds) | 160 | 230 | 60 |
| Exciting Field (Magnetizing force in Oersteds for maximum efficiency) | 300 | 450 | 70 |

The hysteresis losses per cycle for exciting fields of from about 50 to 700 oersteds for each of the above materials are illustrated in the accompanying drawing.

FIGURE 1 of the drawing illustrates the hysteresis losses of the alloy prepared in accordance with Example 1, as compared with the hysteresis losses of a 17% cobalt steel alloy, curve 10 representing the data for the alloy of Example 1 and curve 11 representing the corresponding hysteresis losses for the cobalt steel alloy. It will be noted from the graph that the hysteresis losses represented by curve 10 are about 70% greater than the corresponding losses represented by curve 11, when the magnetizing force is less than about 350 oersteds. Such differential is proportional to the differences between the torques produced by use of the corresponding alloy materials in a hysteresis torque device.

Curve 20 in FIGURE 2 is a plot of the hysteresis losses of the alloy prepared in accordance with Example 2, when subjected to a magnetizing force ranging up to about 100 oersteds. Curve 21 is the corresponding plot for the energy losses of the P-6 alloy when subjected to such magnetizing forces. It will be noted that the hysteresis losses, and consequent torques developed, by the alloy of Example 2 are greater than those of the P-6 alloy for magnetizing forces of from about 75 to 100 oersteds. Moreover, as noted above, the alloy of Example 2 as well as the other alloys prepared in accordance with the present invention may be provided in a one-piece construction, whereas the P-6 alloy must, as is known in the art, be incorporated in a multiple ply laminated assembly. When such an assembly is employed in a hysteresis device subjected to relatively high speed rotational forces, e.g., in a gyro incorporated in a space satellite, or the like, the distinct possibility of a slight mass shift between the several plies of the laminated assembly presents a substantial risk of failure of the entire device. Such problem is not attendant to the use of a one-piece magnetic element constituted of an alloy in accordance with the present invention.

In FIGURE 3, curve 30 illustrates the hysteresis losses of the alloy of Example 3 and curve 31 illustrates the corresponding characteristics of a 36% cobalt steel alloy. As discussed above in connection with the alloys whose hysteresis characteristics are plotted in FIGURE 1, it will be noted that the hysteresis loss, and the consequent torque developed, is about 70% greater employing the alloy of Example 3, as compared with the cobalt steel alloy.

It is apparent from the preceding description, taken in connection with the accompanying drawing, that the hysteresis alloys of the present invention provide superior characteristics for use in hysteresis torque devices. Since certain changes may be made in the method of producing such alloys and in the resulting magnetically anisotropic hysteresis elements without departing from the scope of this invention, it is intended that all matter contained in the above description or shown in the accompanying drawing shall be interpreted as illustrative and not in a limiting sense.

I claim:
1. A method for the manufacture of a magnetically anisotropic hysteresis alloy exhibiting a hysteresis loss of from 0.03 to 1.5 joules/in.$^3$/cycle when subjected to a magnetizing force of 50 to 350 oersted, a peak efficiency of from 0.310 to 0.345, an energy factor in excess of 0.75 and a small coercive force of from 50 to 300 oersted, for use in a hysteresis torque device, which comprises:
 (a) heating a composition consisting essentially of from 20 to 26 weight percent cobalt, from 11 to 17 weight percent nickel, from 7 to 9 weight percent aluminum, from 0.3 to 3 weight percent silicon, up to 3 weight percent zirconium, up to 3 weight percent copper, up to 0.3 weight percent titanium, and the balance substantially iron, at a tempertaure sufficient to melt each of such constituents;
 (b) casting the molten alloy into a predetermined shape and cooling the casting to ambient temperature;
 (c) heating the casting to a temperature above the Curie point of the alloy;
 (d) cooling the casting to ambient temperature while simultaneously subjecting it to a magnetic field to effect magnetic hardening thereof; and
 (e) subjecting the hardened, magnetically-anisotropic casting to a double ageing treatment comprising sequentially heating the casting at a temperature in excess of 650° C. for a period of from ½ to 1½ hours, and subsequently heating said casting at a tempera- ture of from 550° C. to 600° C. for a period of from 1 to 10 hours.

2. The method of defined in claim 1, in which said double ageing treatment involves initially heating said casting to a double ageing treatment comprising se- after heating said casting at a temperature of 570° C. for 2 hours.

3. The method as defined in claim 1, in which said double ageing treatment involves initially heating said casting at a temperature of 750° C. for 1½ hours, and thereafter heating said casting at a temperature of 570° C. for 1 hour.

4. The method as defined in claim 1, in which said double ageing treatment involves initially heating said casting at a temperature of 750° C. for 1 hour, and thereafter heating said casting at a temperature of 570° C. for 6 hours.

5. A method for the manufacture of a magnetically anisotropic hysteresis alloy exhibiting a hysteresis loss of from 0.03 to 1.5 joules/in.³/cycle when subjected to a magnetizing force of 50 to 350 oersted, a peak efficiency of from 0.310 to 0.345, an energy factor in excess of 0.75 and a small coercieve force of from 50 to 300 oersted, for use in a hysteresis torque device, which comprises:
  (a) heating a composition consisting essentially of from 20 to 26 weight percent cobalt, from 11 to 17 weight percent nickel, from 7 to 9 weight percent aluminum, from 0.3 to 3 weight percent silicon, up to 3 weight percent zirconium, up to 3 weight percent copper, up to 0.3 weight percent titanium and the balance substantially iron, at a temperature sufficient to melt each of such constituents;
  (b) casting the molten alloy into a predetermined shape and cooling the casting to ambient temperature;
  (c) heating the casting to a temperature above the Curie point of the alloy;
  (d) cooling the casting at a rate of from 30° C. to 60° C. per minute while simultaneously subjecting it to a magnetic field to effect magnetic hardening thereof; and
  (e) subjecting the hardened magnetically-anisotropic casting to a double ageing treatment involving initially heating the casting at a temperature of from 700° C. to 775° C. for a period of from ½ to ½ hours and subsequently heating said casting at a temperature of from 550° C. to 600° C. for a period of from 1 to 10 hours.

6. A method for the manufacture of a magnetically anisotropic hysteresis alloy exhibiting a hysteresis loss of from 0.03 to 1.5 joules/in.³/cycle when subjected to a magnetizing force of 50 to 350 oersted, a peak efficiency of from 0.310 to 0.345, an energy factor in excess of 0.75 and a small coercive force of from 50 to 300 oersted, for use in a hysteresis torque device, which comprises:
  (a) heating a composition consisting essentially of from 20 to 26 weight percent cobalt, from 11 to 17 weight percent nickel, from 7 to 9 weight percent aluminum, from 0.3 to 3 weight percent silicon, up to 3 weight percent zirconium, up to 3 weight percent copper, up to 0.3 weight percent titanium, and the balance substantially iron, at a temperature of at least 1650° C. to melt each of such constituents;
  (b) casting the molten alloy into a predetermined shape and cooling the casting to ambient temperature;
  (c) heating the casting to 920° C.;
  (d) cooling the casting at a rate of from 30° C. to 60° C. per minute while simultaneously subjecting it to a magnetic field of at least 200 oersteds to effect magnetic hardening thereof; and
  (e) subjecting the hardened magnetically-anisotropic casting to a double ageing treatment involving initially heating the casting at a temperature of from 700° C. to 775° C. for a period of from ½ to 1½ hours and subsequently heating said casting at a temperature of from 550° C. to 600° C. for a period of from 1 to 10 hours, the resulting alloy having a hysteresis loss of from 0.03 to 1.5 joules/in.³/cycle when subjected to a magnetizing field having a strength of from 50 to 350 oersteds.

References Cited by the Examiner

UNITED STATES PATENTS

| | | | |
|---|---|---|---|
| 2,131,994 | 10/1938 | Hensel | 148—158 |
| 2,317,294 | 4/1943 | Nesbitt | 148—102 |
| 2,442,762 | 6/1948 | Ellis et al. | 148—102 |
| 2,499,861 | 3/1950 | Hansen | 148—102 |
| 2,694,166 | 11/1954 | Hadfield | 148—102 |
| 2,694,167 | 11/1954 | Hadfield et al. | 148—102 |
| 2,766,155 | 10/1956 | Betteridge et al. | 148—158 |
| 2,961,360 | 11/1960 | Kouvel et al. | 148—103 |
| 2,982,678 | 5/1961 | Howe | 148—103 |
| 3,108,912 | 10/1963 | Frischmann et al. | 148—31.55 |
| 3,130,090 | 4/1964 | Jackson | 148—31.55 |

DAVID L. RECK, *Primary Examiner.*

N. F. MARKVA, *Assistant Examiner.*